United States Patent
Pain et al.

(10) Patent No.: US 7,130,028 B2
(45) Date of Patent: Oct. 31, 2006

(54) METHOD OF DETECTING A LUMINOUS SIGNAL AND LIDAR SYSTEM

(75) Inventors: Thierry Pain, Mougins (FR); Rodolphe Krawczyk, Villeneuve Loubet (FR)

(73) Assignee: Alcatel, Paris (FR)

( * ) Notice: Subject to any disclaimer, the term of this patent is extended or adjusted under 35 U.S.C. 154(b) by 161 days.

(21) Appl. No.: 10/759,155

(22) Filed: Jan. 20, 2004

(65) Prior Publication Data
US 2004/0145721 A1    Jul. 29, 2004

(30) Foreign Application Priority Data
Jan. 21, 2003    (FR) .................................. 03 00600

(51) Int. Cl.
*G01C 3/08*    (2006.01)
(52) U.S. Cl. .................... 356/4.01; 356/4.01; 356/5.01
(58) Field of Classification Search ................ 356/4.01
See application file for complete search history.

(56) References Cited

U.S. PATENT DOCUMENTS 4,712,018 A * 12/1987 Stoffel et al. ............ 250/208.1
4,757,200 A    7/1988 Shepherd
5,013,917 A * 5/1991 Ulich ........................ 250/330
5,665,959 A * 9/1997 Fossum et al. .......... 250/208.1
6,444,968 B1 * 9/2002 Burt et al. ............... 250/208.1

FOREIGN PATENT DOCUMENTS

EP    1 099 405 A1    5/2001
EP    1 111 908 A1    6/2001

* cited by examiner

*Primary Examiner*—Thomas H. Tarcza
*Assistant Examiner*—Luke Ratcliffe
(74) *Attorney, Agent, or Firm*—Sughrue Mion, PLLC

(57) ABSTRACT

A lidar detection system comprises a CCD sensor for converting a returned light signal into electrical charges that are amplified at the output of the sensor itself with no significant noise and without it being necessary to accumulate the results of a plurality of firings to obtain sufficient signals.

10 Claims, 2 Drawing Sheets

METHOD OF DETECTING A LUMINOUS SIGNAL AND LIDAR SYSTEM

CROSS-REFERENCE TO RELATED APPLICATIONS

This application is based on French Patent Application No. 03 00 600 filed Jan. 21, 2003, the disclosure of which is hereby incorporated by reference thereto in its entirety, and the priority of which is hereby claimed under 35 U.S.C. § 119.

BACKGROUND OF THE INVENTION

1. Field of the Invention

The subject matter of the present invention is a method of detecting a light signal and a corresponding lidar system.

2. Description of the Prior Art

Lidar detection systems essentially comprise means, such as a laser, for emitting a light signal toward an object to be studied and a device for receiving a signal returned from the object by diffusion or reflection, the means and the device being synchronized with each other. Certain characteristics of the object can be deduced by processing the returned signal. The problem addressed here is that of supplying a signal of sufficient intensity to be read by the processing means. In some prior art lidar detection systems, a counting method is used in which photons are individually converted into electrons in a detector, with a known multiplication factor sufficient to distinguish the signal from the background noise of the system. However, the method is limited to very weak signals. Another method consists in passing the signal resulting from converting photons into electrical charges through a current amplifier preceding the processing means. As the background noise of the system is subject to the same amplification, this method is suitable only for high signal values. In practice, a plurality of detection systems that are calibrated differently must be used when the successive sample values of the signal have different intensities.

The patents EP 0 905 284 and EP 1 111 908 describe a charge accumulation and coupling (CCD) photosensor that comprises an array of cells arranged in rows and columns. The light signal is first collected over an image region and converted into electrical charges that are displaced periodically through a memory region to a read device.

The sensor has the benefit of lending itself to convenient sampling of the signal on the memory rows; however, it does not solve the problem of excess noise when reading samples of low intensity. In the above patents, in addition to integrating charges on the last row of the image region, samples corresponding to successive firings are integrated in the memory region before reading. It is therefore no longer possible to process a particular firing and good synchronization of firings is required. If a portion of the signal is skewed, all of the samples are affected by the error and are lost. Cell saturation is also a risk for the high samples that are accumulated.

The invention is concerned with improving lidar systems by using CCD photosensors that differ from those used in this application in the prior art in that they amplify the signal under conditions that are simultaneously reliable and less constraining than the accumulation of a plurality of firings.

The signal is amplified in the read region instead of in the memory region and by means of a charge multiplication process such that the individual results of the firings can be considered.

SUMMARY OF THE INVENTION

Thus one aspect of the invention consists in a lidar detection system comprising a device for emitting a light signal, a device for transmitting a returned portion of the light signal toward a sensor that converts it into an electrical signal and comprises cells arranged in rows and columns and successively consists of an image region comprising at least one row of photocells onto which the portion of the light signal is focused and which convert the returned portion of the light signal into electrical charges, a memory region comprising a plurality of rows of cells that are not photosensitive, and a read region comprising a row of cells that multiply the electrical charges, and timing means for shifting the electrical charges along the columns, from the image region to the memory region and then to the read region and toward a processing device.

No other amplifier is necessary in the system. Another aspect of the invention consists in a method of detecting a light signal, comprising continual conversion of the light signal into electrical charges in a receiving portion of a sensor, periodic sampling of the signal by taking up charges accumulated in the receiver portion to form therefrom samples of the signal, and chained movement of the samples through a memory and then toward a processing device, in which method the samples are subjected to amplification in the sensor by multiplication of electrical charges just before being shifted toward the processing device but remain unchanged in the memory.

The invention is described next with reference to the appended drawings.

DETAILED DESCRIPTION OF THE PREFERRED EMBODIMENT

Figure 1:
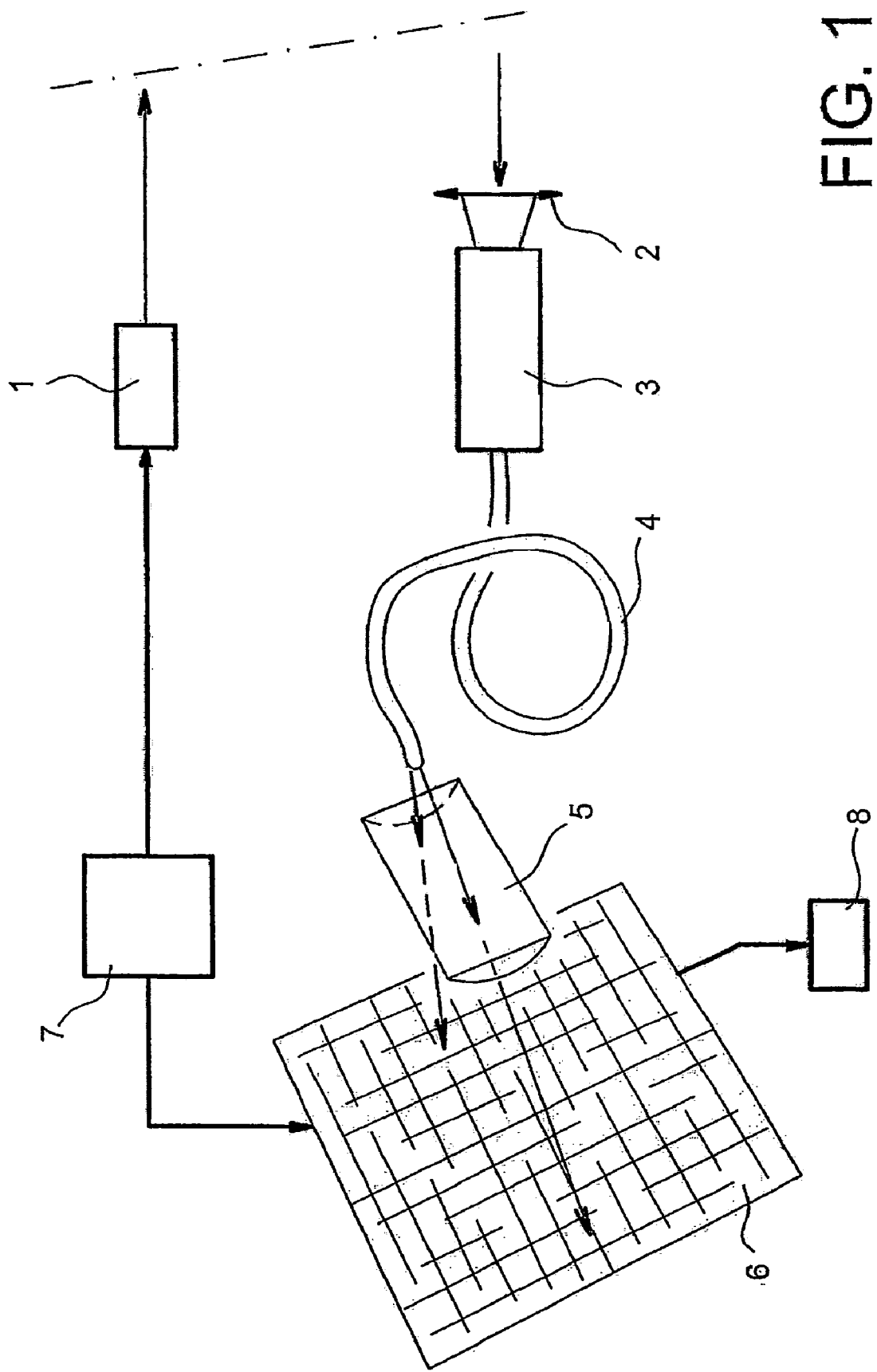
FIG. 1 is a general view of a lidar detection device equipped with the invention.

The lidar detection device shown in FIG. 1 comprises illumination means in the form of a laser 1 emitting a ray of light toward the object to be studied (not shown, but possibly a cloud or a plume of gas in applications frequently encountered). The radiation reflected or diffused by the object is collected by a transmission device, and first of all by a receive optic 2, and can be processed by an interferometer 3. The light signal then passes through an optical fiber 4 and a cylindrical lens 5 to a sensor 6 that converts it into a sampled electrical signal. Timing means 7 control firing of the laser 1 and servicing of the sensor 6. Processing means 8 read the electrical signal processed by the sensor 6.

Figure 2:
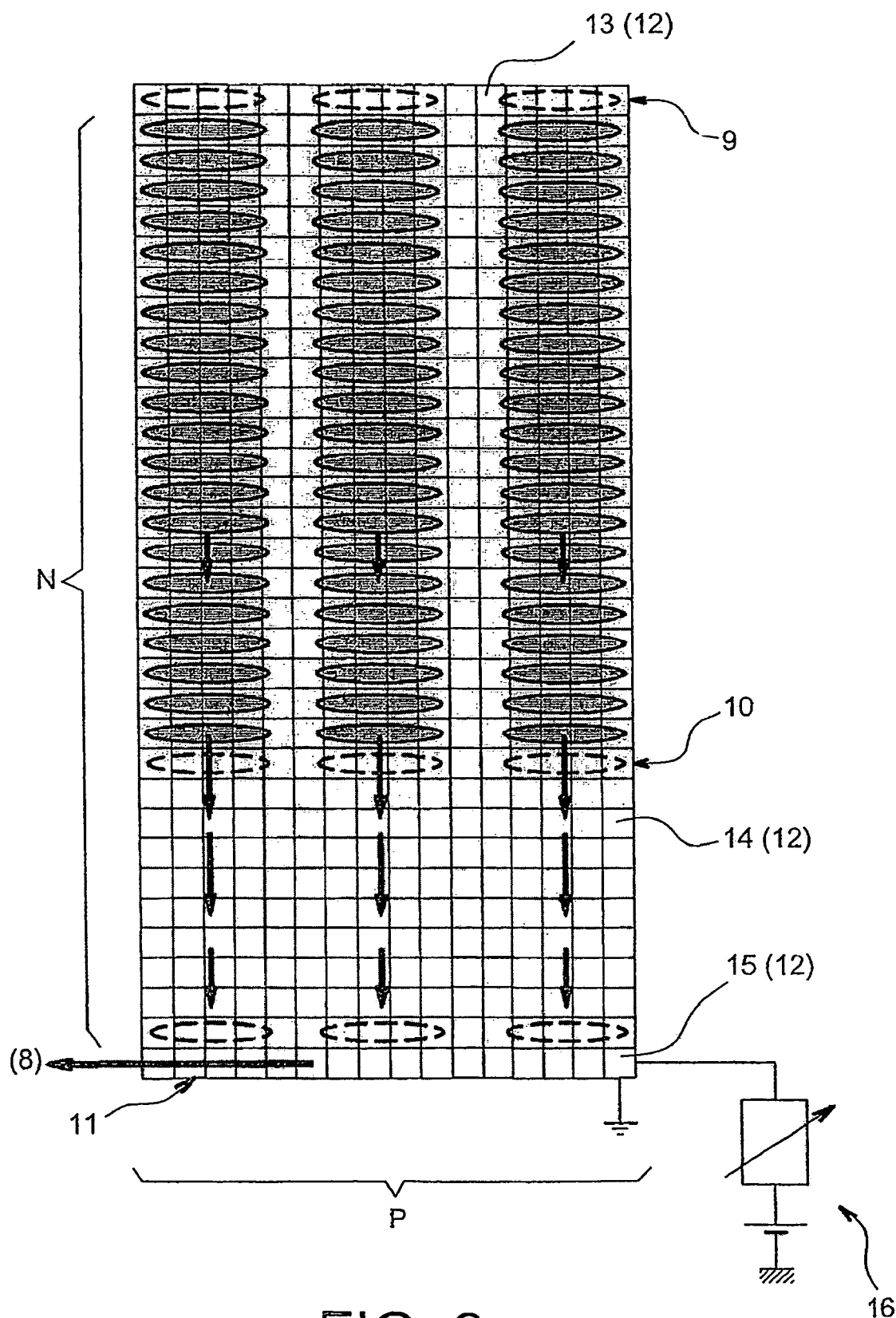
FIG. 2 shows a CCD sensor used in the invention.

FIG. 2 shows the sensor 6. It comprises an image region 9, a memory region 10, and a read region 11. The three regions are contiguous and take the form of matrices of cells 12, of different nature in each of the regions, in which they are therefore designated by the reference numbers 13, 14 and 15. The cells 12 are arranged in P columns extending across the three regions 9, 10 and 11. The memory region 10 comprises N rows of cells 14, the read region 11 comprises a single row of cells 15, and the image region 9 advantageously comprises a single row of cells 13, although a plurality of rows can be used, in imitation of prior art sensors, in order to capture a plurality of separate light sources simultaneously.

On receiving a returned firing, the light signal reaches the sensor 6 in the form of a spot elongated into the form of a straight line by the particular focusing effect of the lens 5 (extension in the direction of the rows and contraction in the direction of the columns). The width of this row is advantageously less than that of the cells 13, so as to be received on the single row thereof in the image region 9. The light spot extends laterally over a sufficient number of columns to avoid the risk of saturating either of the cells 13. A plurality of adjoining light spots are represented here, and the sensor 6 can be assigned to collecting and processing simultaneously different light signals coming from respective channels and delivered by parallel optical fibers, as is standard practice for analyses at different wavelengths.

The cells 13 are photocells that convert the photons into electrical charges and allow them to accumulate. It is pointless to accumulate further charges along the columns if the image region 9 comprises a plurality of rows, which is known in the art for raising the sample values. The timing means 7 command the sensor 6 periodically. The contents of the cells 12 are then sampled and shifted to the next lower row of cells 12. The accumulated charges are therefore transferred from the cells 13 of the image region 9 in the top row of the memory region 10 into the subsequent rows of the memory region 10 and replaced by the charges accumulated thereafter in the image region 9. By repeating this process, a sample of the returned signal is stored in the memory region 10, the lower rows corresponding to earlier sampling times. The cells 14 of the memory region 10 are designed to allow the above transfers but are not photosensitive. In practice, they can be of the same composition as the cell 13 but masked by an opaque coating.

When the signal has been sampled, it can be read while continuing to transfer charges toward the bottom of the columns of the cells 12, until they reach the cells 15 of the read region 11. There they undergo a multiplication caused by an increase in their control voltage, for example from 5 V to 50 V, which amplifies them. The noise that is also amplified is that of the cells 12, which is very low. The samples of the signal in the read region 11 thus remain representative of the returned light signal, and there is no longer any need to accumulate samples over repetitive firings to alleviate a low signal level. On the contrary, if the signal is high, saturation of the cells 14 of the memory region 10 is avoided. It is still possible to adjust the multiplication ratio of the charges in the read region 11 by operating on the means 16 for adjusting the control voltage of their cells 15.

Finally, the multiplied charges are dumped cell by cell to the processing means 8, which digitizes them.

There is claimed:

1. A lidar detection system comprising a device for emitting a light signal, a device for transmitting a returned portion of said light signal toward a sensor that converts it into an electrical signal and comprises cells arranged in rows and columns and successively consists of an image region comprising at least one row of photocells onto which said portion of said light signal is focused and which convert said returned portion of said light signal into electrical charges, a memory region comprising a plurality of rows of cells that are not photosensitive, and a read region comprising a row of cells that multiply said electrical charges, and timing means for shifting said electrical charges along said columns, from said image region to said memory region and then to said read region and toward a processing device, such that each row of said image region is stepped through each row of said memory region.

2. The lidar detection system claimed in claim 1 wherein said image region comprises a total of one row of cells and said transmission device comprises a lens for focusing said returned portion of said light signal by contracting it in the direction of said columns and expanding it in the direction of said rows.

3. The lidar detection system claimed in claim 1, comprising means for adjusting a control voltage of said cells of said read region.

4. The lidar detection system claimed in claim 2, comprising means for adjusting a control voltage of said cells of said read region.

5. A method of detecting a light signal, comprising continual conversion of said light signal into electrical charges in a receiving portion of a sensor, periodic sampling of said signal by taking up charges accumulated in said receiver portion to form therefrom samples of said signal, and chained movement of said samples through a memory and then toward a processing device, in which method said samples are subjected to amplification in said sensor by multiplication of electrical charges just before being shifted toward said processing device but remain unchanged in said memory.

6. A lidar detection system, comprising:
a light emitter that emits a light signal;
a sensor; and
a transmitter that transmits a returned portion of the light signal towards the sensor;
wherein the sensor converts the transmitted light signal into an electrical signal, the sensor comprising cells arranged in rows and columns that define an image region comprising at least one row of photocells onto which the transmitted light signal is focused and that convert the transmitted light signal into electrical charges, a memory region comprising a plurality of rows of cells that are not photosensitive, and a read region comprising a row of cells that multiply the electrical charges;
the lidar detection system further comprising a timer that shifts the electrical charges along said columns, from the image region to the memory region and then to the read region and toward a processing device, such that each row of said image region is stepped through each row of said memory region.

7. The lidar detection system according to claim 6, wherein the image region, memory region and read region are successively arranged in the sensor.

8. The lidar detection system according to claim 6, wherein the total number of rows of the image region is less than the total number of rows of the memory region.

9. A lidar detection system, comprising:
a light emitter that emits a light signal;
a sensor; and
a transmitter that transmits a returned portion of the light signal towards the sensor;
wherein the sensor converts the transmitted light signal into an electrical signal, the sensor comprising cells arranged in rows and columns that define an image region comprising at least one row of photocells onto which the transmitted light signal is focused and that convert the transmitted light signal into electrical charges, a memory region comprising a plurality of rows of cells that are not photosensitive, and a read region comprising a row of cells that multiply the electrical charges;
the lidar detection system further comprising a timer that shifts the electrical charges along said columns, from the image region to the memory region and then to the read region and toward a processing device; and wherein the total number of rows of the image region is less than the total number of rows of the memory region.

10. The lidar detection system according to claim 9, wherein the image region comprises a total of one row of cells.

* * * * *